United States Patent
Willcox

(10) Patent No.: US 11,209,296 B2
(45) Date of Patent: Dec. 28, 2021

(54) NON-INTRUSIVE PROCESS FLUID PRESSURE MEASUREMENT SYSTEM

(71) Applicant: Rosemount Inc., Shakopee, MN (US)

(72) Inventor: Charles R. Willcox, Chanhassen, MN (US)

(73) Assignee: Rosemount Inc., Shakopee, MN (US)

(*) Notice: Subject to any disclaimer, the term of this patent is extended or adjusted under 35 U.S.C. 154(b) by 503 days.

(21) Appl. No.: 16/146,134

(22) Filed: Sep. 28, 2018

(65) Prior Publication Data

US 2020/0103260 A1 Apr. 2, 2020

(51) Int. Cl.
*G01F 1/34* (2006.01)
*G01L 7/02* (2006.01)
*G01L 19/00* (2006.01)
*G01L 19/14* (2006.01)

(52) U.S. Cl.
CPC .......... *G01F 1/34* (2013.01); *G01L 7/022* (2013.01); *G01L 7/024* (2013.01); *G01L 19/0092* (2013.01); *G01L 19/147* (2013.01); *G01L 2019/0053* (2013.01)

(58) Field of Classification Search
CPC . G01F 1/34; G01L 7/022; G01L 7/024; G01L 19/0092
See application file for complete search history.

(56) References Cited

U.S. PATENT DOCUMENTS

| | | | | |
|---|---|---|---|---|
| 5,024,099 A * | 6/1991 | Lee | ............... | G01L 9/0002 361/283.2 |
| 6,601,458 B1 * | 8/2003 | Gysling | ............... | G01F 1/74 73/861.04 |
| 6,837,098 B2 * | 1/2005 | Gysling | ............... | G01F 1/7082 73/61.47 |
| 6,957,588 B1 * | 10/2005 | Kicher | ............... | G01L 9/0027 73/720 |
| 7,779,698 B2 * | 8/2010 | Willcox | ............... | G01F 1/383 73/716 |

(Continued)

FOREIGN PATENT DOCUMENTS

WO     2017060714     4/2017

OTHER PUBLICATIONS

International Search Report and Written Opinion for International Patent Application PCT/US2019/052639, dated Jan. 10, 2020, date of filing: Sep. 24, 2019, 12 pages.

(Continued)

*Primary Examiner* — Jamel E Williams
(74) *Attorney, Agent, or Firm* — Christopher R. Christenson; Kelly, Holt & Christenson PLLC

(57) ABSTRACT

A system for non-intrusively measuring process fluid pressure within a process fluid conduit is provided. The system includes a measurement bracket configured to couple to an external surface of the process fluid conduit. The measurement bracket generates a variable gap based on deformation of the process fluid conduit in response to process fluid pressure therein. A gap measurement system is coupled to the measurement bracket and provides an electrical signal based on a measurement of the variable gap. A controller is coupled to the gap measurement system and is configured to calculate and provide a process fluid pressure output based on the electrical signal and information relative to the process fluid conduit.

27 Claims, 14 Drawing Sheets

(56) References Cited

U.S. PATENT DOCUMENTS

2007/0044572 A1\* 3/2007 Davis .................. G01F 1/704
73/861.42
2009/0120195 A1\* 5/2009 Willcox ................ G01F 1/383
73/718

OTHER PUBLICATIONS

First Office Action for Chinese Patent Application No. 201910881182. 0, dated Dec. 16, 2021, 20 pages including English translation.
Second Office Action for Chinese Patent Application No. 201910881182. 0, dated Jul. 22, 2021, 18 pages including English translation.
Office Action for Russian Patent Application No. 2021111906, dated Sep. 3, 2021, 13 pages including English translation.

\* cited by examiner

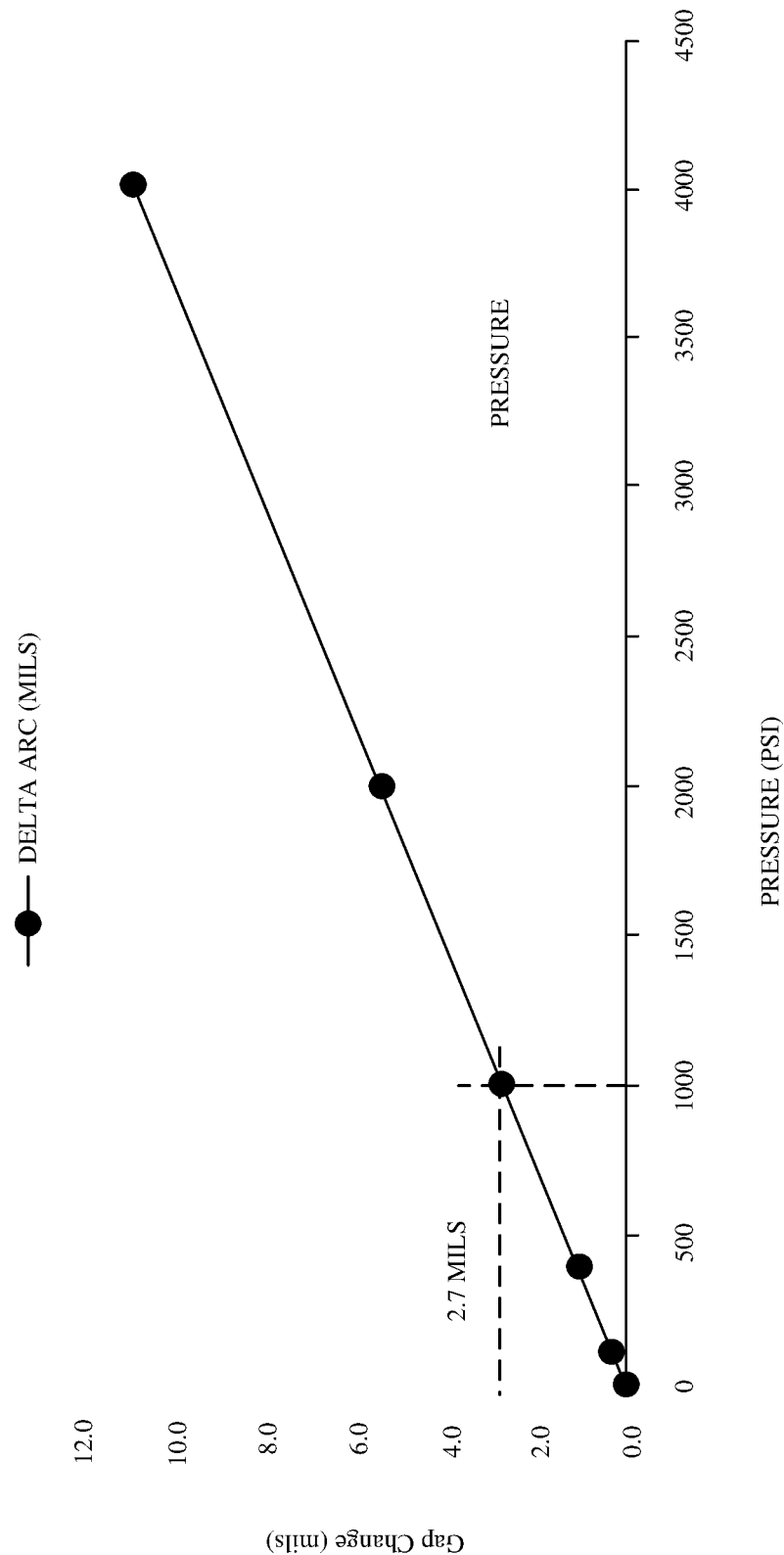

| SST PIPE SCHEDULE | WALL THICKNESS (in) | DEFLECTION (mils/ksi) |
|---|---|---|
| 10 | 0.120 | 1.40 |
| 40 | 0.237 | 0.74 |
| 80 | 0.337 | 0.54 |

FIG. 9

NON-INTRUSIVE PROCESS FLUID PRESSURE MEASUREMENT SYSTEM

BACKGROUND

Many industrial processes convey process fluids through pipes or other conduits. Such process fluids can include liquids, gases, and sometimes entrained solids. These process fluid flows may be found in a variety of industries including, without limitation, hygienic food and beverage production, water treatment, high-purity pharmaceutical manufacturing, chemical processing, the hydrocarbon fuel industry, including hydrocarbon extraction and processing as well as hydraulic fracturing techniques utilizing abrasive and corrosive slurries.

Industrial processes are used in the manufacturing and transport of many types of materials, as set forth above. In such systems, it is often useful to measure process fluid pressure using a pressure sensor that is typically contained in, or coupled to, a process fluid pressure sensor which is electrically coupled to or part of a process fluid pressure transmitter that transmits pressure-related information to one or more remote device, such as a control room. The transmission is frequently over a process control loop.

In the measurement of process fluid pressure, it is relatively common, to operatively couple a pressure sensor to the process fluid using an aperture or intrusion in a process fluid conduit. In many instances, an isolation diaphragm is placed in direct contact with the process fluid and flexes in response to process fluid pressure. An opposite side of the isolation diaphragm is in contact with a fill fluid in a fill fluid conduit that conveys the isolation diaphragm movement to a sensing diaphragm of the pressure sensor. An electrical structure on the pressure sensor (such as a resistive, capacitive, or piezoelectric element) is responsive to movement of the sensing diaphragm of the pressure sensor and provides a signal that is measurable using measurement electronics of the process fluid pressure transmitter. However, this approach may not always be practical in that the process fluid may have a very high temperature, be very corrosive, or both. Additionally, process intrusions to couple a pressure sensor to the process fluid generally require a threaded port or other robust mechanical mount/seal in the conduit and thus, must be designed into the process fluid flow system at a defined location. Accordingly, while such techniques are useful for providing accurate process fluid pressure indications, they have some limitations.

SUMMARY

A system for non-intrusively measuring process fluid pressure within a process fluid conduit is provided. The system includes a measurement bracket configured to couple to an external surface of the process fluid conduit. The measurement bracket generates a variable gap based on deformation of the process fluid conduit in response to process fluid pressure therein. A gap measurement system is coupled to the measurement bracket and provides an electrical signal based on a measurement of the variable gap. A controller is coupled to the gap measurement system and is configured to calculate and provide a process fluid pressure output based on the electrical signal and information relative to the process fluid conduit.

BRIEF DESCRIPTION OF THE DRAWINGS

FIG. 5 is a chart of gap change versus process fluid pressure for an embodiment of the present invention.

FIG. 9 is a table tabulating the expected surface deflections from 1,000 psi of pressure on (4.5 in O.D.) stainless steel pipe schedules having various wall thicknesses.

DETAILED DESCRIPTION OF ILLUSTRATIVE EMBODIMENTS

Embodiments described herein generally leverage the ability to reliably and accurately measure the actual deformation of the process fluid conduit itself and characterize such deformation in such a way that an accurate process fluid pressure can be estimated and provided.

Figure 1:
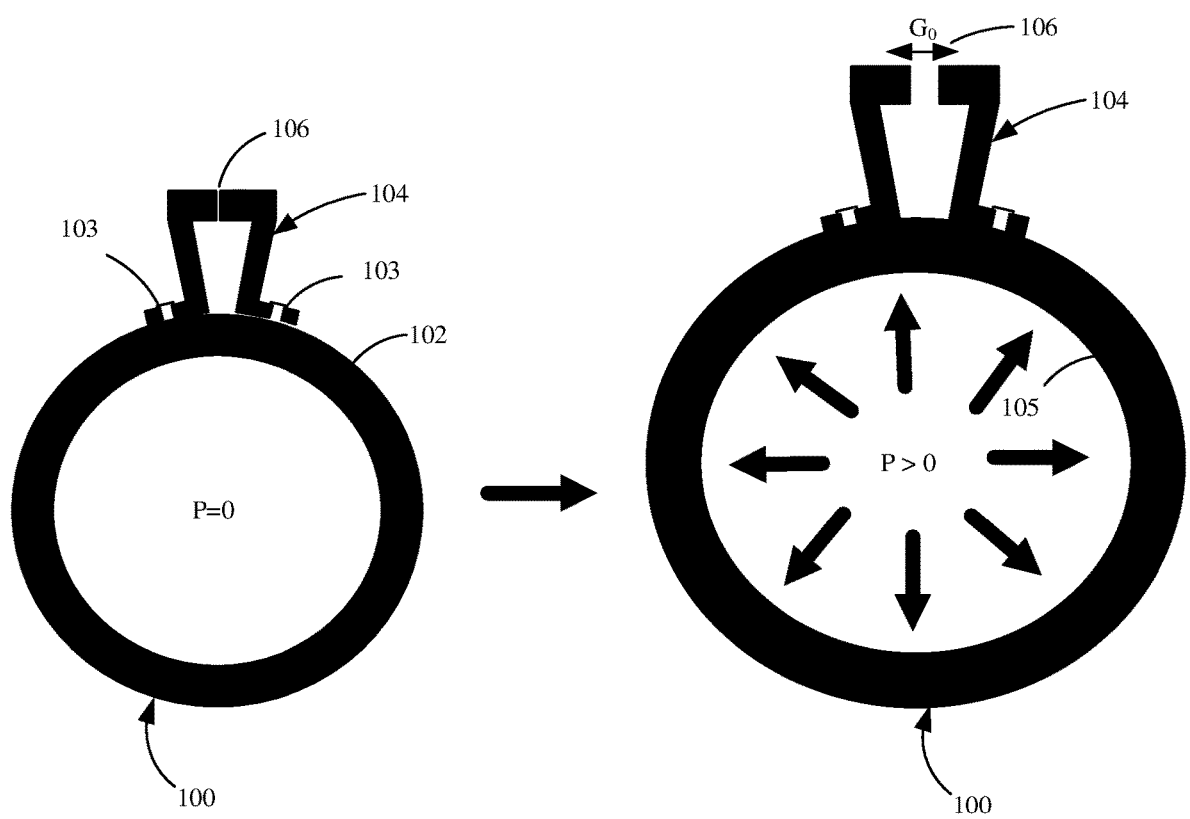
FIG. 1 is a cross-sectional diagrammatic view illustrating deformation of a process fluid conduit in response to an increase in pressure.

FIG. 1 is a diagrammatic view showing an exaggerated process fluid conduit deformation. As shown on the left most portion of FIG. 1, process fluid conduit 100 (shown in cross section) has an internal pressure P of 0. A mirrored or opposing structure 104 is attached to an external surface 102 of process fluid conduit 100. In one example, each half is a mirrored-Z structure that is welded at welds 103 to external diameter 102 of process fluid conduit 100. As shown, at internal pressure P=0, the mirrored-Z structure 104 has a relatively small gap 106. In the right portion of FIG. 1, an internal pressure P (where P>0) is provided that is exerted equally upon the inner diameter 105 of conduit 100 thereby increasing the outer diameter 102 of conduit 100. When this occurs, each half of mirrored Z-structure 104 moves apart slightly and gap 106 (also labeled as $G_0$) increases. Accordingly, it can be seen that process fluid pressure can be inferred or estimated using a specialized assembly comprised of a pair of brackets that can be tack welded, or otherwise attached, to an exterior of the pipe with a relatively small gap separating the brackets. The gap will separate as the internal pressure of process fluid conduit 100 increases. An important aspect of this operational technique is the design of the brackets or other suitable structure in such a way as to maximize pressure sensitivity while reducing temperature-induced effects.

Figure 2:
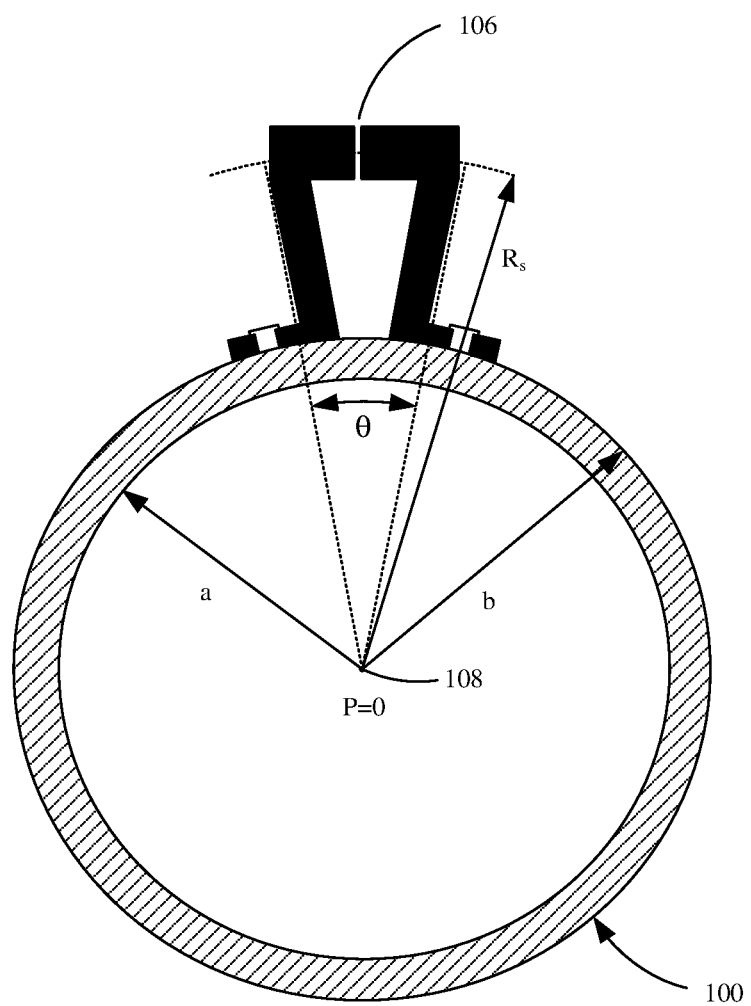
FIG. 2 is a diagrammatic cross-sectional view illustrating various parameters useful for detecting conduit deformation and relating such deformation to process fluid pressure in accordance with an embodiment of the present invention.

FIG. 2 is a diagrammatic view of the structure illustrated with respect to FIG. 1, showing various quantities in order to further illustrate a theory of operation. In FIG. 2, process fluid conduit 100 has an internal radius a and an external radius b. Additionally, the mirrored-Z structure has a height defined in terms of the distance of gap 106 from center 108 of process fluid conduit 100. In the illustrated example, this height is defined as $R_s$. Further, the angle of separation between the radially extending walls of mirrored-Z structure 104 is defined as sweep angle $\Theta$. Embodiments described herein generally quantify the change in the outer circumference of a thick-walled conduit, defined as $\Delta S$, when a pressure P is introduced inside the conduit. The assumption is that the outside pressure is zero. However, the expressions described below can be easily adapted to accommodate situations where the external pressure, such as ambient atmospheric pressure, is different. Under the no-exterior pressure assumption, the change in circumference ($\Delta S$) is determined from the following equation:

$$\Delta S = 2\pi \cdot b \left\{ 2 \frac{P}{E} \left[ \frac{a^2}{(b^2 - a^2)} \right] \right\} \quad \text{Equation 1}$$

Where E is the Young's Modulus of the conduit and a and b are the inner and outer pipe radii, respectively.

The quantity in curly brackets is the change in hoop strain on the outer surface of the process fluid conduit as pressure is applied. It can be seen that the gap spacing 106 between the brackets goes from $G_0$ to a new value $G(P)$ when a pressure P is applied according to:

$$G(P) = G_0 + 2\pi \cdot R_s \cdot \left(\frac{\theta}{360}\right) \left\{ 2 \frac{P}{E} \left[ \frac{a^2}{(b^2 - a^2)} \right] \right\} \quad \text{Equation 2}$$

Equation 2 above can be rewritten as:

$$G(P) = G_0 \left(1 + K \left\{ 2 \frac{P}{E} \left[ \frac{a^2}{(b^2 - a^2)} \right] \right\} \right) \quad \text{Equation 3}$$

Where K is an amplification factor defined by:

$$K = 2\pi \cdot \frac{R_s}{G_0} \cdot \left(\frac{\theta}{360}\right) \quad \text{Equation 4}$$

Figure 3:
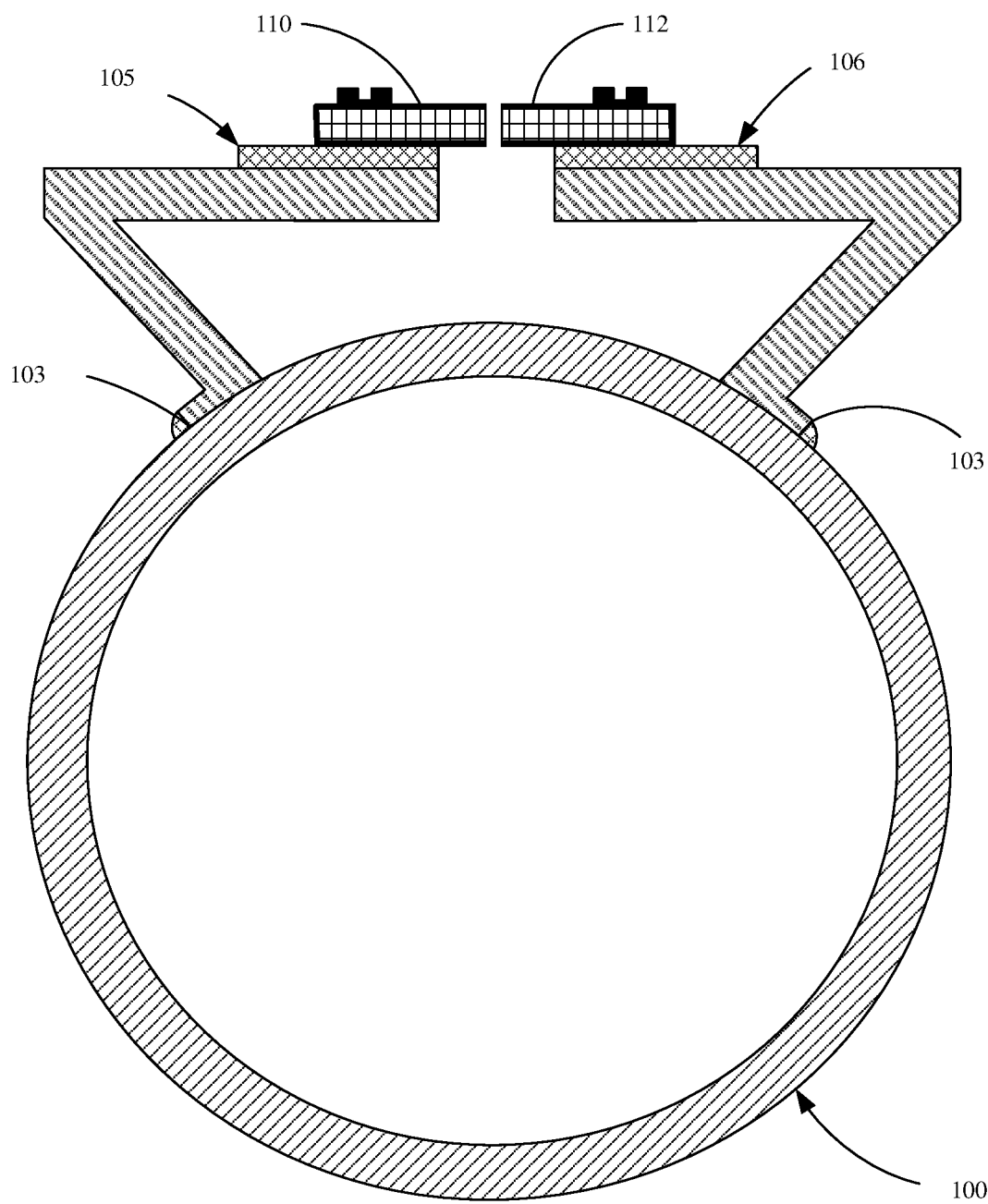
FIG. 3 is a diagrammatic cross-sectional view illustrating a deformation detector in accordance with an embodiment of the present invention.

One can see in Equation 4 that K will increase whenever $\theta$ or $R_s$ increases, or when $G_o$ decreases. FIG. 3 is a diagrammatic cross-sectional view illustrating a capacitance-based gap change detector in accordance with an embodiment of the present invention. As can be seen, electrodes 110 and 112 are attached to each respective portion of the mirrored-Z gap measurement structure via insulators 107 and 109 respectively. The gap surfaces are the plates of a parallel plate capacitor, which separate as pressure increases. The formula for how the capacitance varies with gap spacing is provided below.

$$C(P) = \frac{\varepsilon_0 A}{G(P)} \quad \text{Equation 5}$$

In the equation above, A is the area of the end of the bar, while $G(P)$ is the gap at pressure P, and $\varepsilon_0$ is the permittivity of free space and has the value of 0.225 pf/in.

Figure 4A:
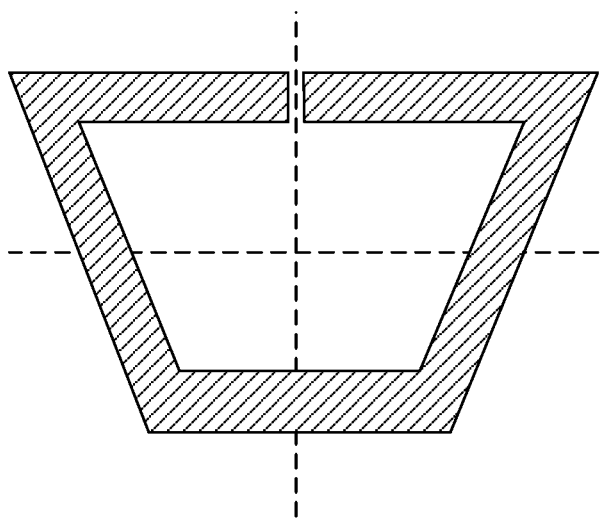
FIGS. 4A-4B are diagrammatic cross-sectional view illustrating the effects of temperature-induced dimensional changes on a detection structure in accordance with an embodiment of the present invention.

In order to understand how temperature changes can affect the type of sensor described above, it is important to consider the geometry in order to minimize thermal effects. FIG. 4A is a diagrammatic view of the trapezoidal structure shown in FIG. 1 and shows what happens as the temperature increases. One important consideration in the minimization of thermal effects, is to match the sensor brackets to the pipe material. Accordingly, if the process fluid conduit is formed of, for example, 304 stainless steel, then the sensor brackets should also be made from 304 stainless steel. Similarly, if the process fluid conduit is formed of carbon steel, then the sensor brackets should also be made of carbon steel, and so forth. When this is the case, the gap will only expand by an amount equal to material of the same width.

The temperature-induced change in the gap ($\Delta G$) can be considered to be $G \cdot \alpha_{metal} \cdot \Delta T$. With pressure, the sensor brackets begin to separate determined by the change in arc length swept by the angle $\Theta$. This arc length change is translated into a gap change via equation 2, which is measurable, as shown above. With a temperature change, the arc length also expands, however, the sensor bracket pieces that project back towards the gap are expanding inwardly. The net effect is that the gap only appreciably changes by an amount proportional to the gap spacing (i.e., G) and not proportional to the arc length. Accordingly, the design amplifies pressure effects (via arc length changes) without a commensurate increase in temperature sensitivity. Additionally, the use of thermal shields, insulation, and copper thermal traces would help reduce the impact of temperature transients on the sensor. Furthermore, an additional bracket disposed adjacent to the measurement bracket, but positioned to not be responsive to pressure, would help eliminate temperature transient effects by way of common-mode rejection or simple ratioing techniques.

FIG. 5 illustrates model results for a particular embodiment described herein. The theoretical (model) gap change at an $R_s$ value of approximately 2.8 in away from the center with applied pressure on a 4.5 in. outside diameter 304 stainless steel schedule 10 pipe is shown. In the illustrated example, a 1,000 psi pressure change produces a gap change of 2.7 mils (0.0027 inches), which is large enough to be easily detected by a variety of means well understood by those skilled in the art, of which capacitance displacement is one of them.

While embodiments described above have generally provided a mirrored or opposing structure that is attached directly (i.e., welded or otherwise adhered) to the outside surface or diameter of a process fluid conduit, it is expressly contemplated that embodiments described herein can be practiced with a structure that clamps directly to a process fluid conduit.

Figure 6A:
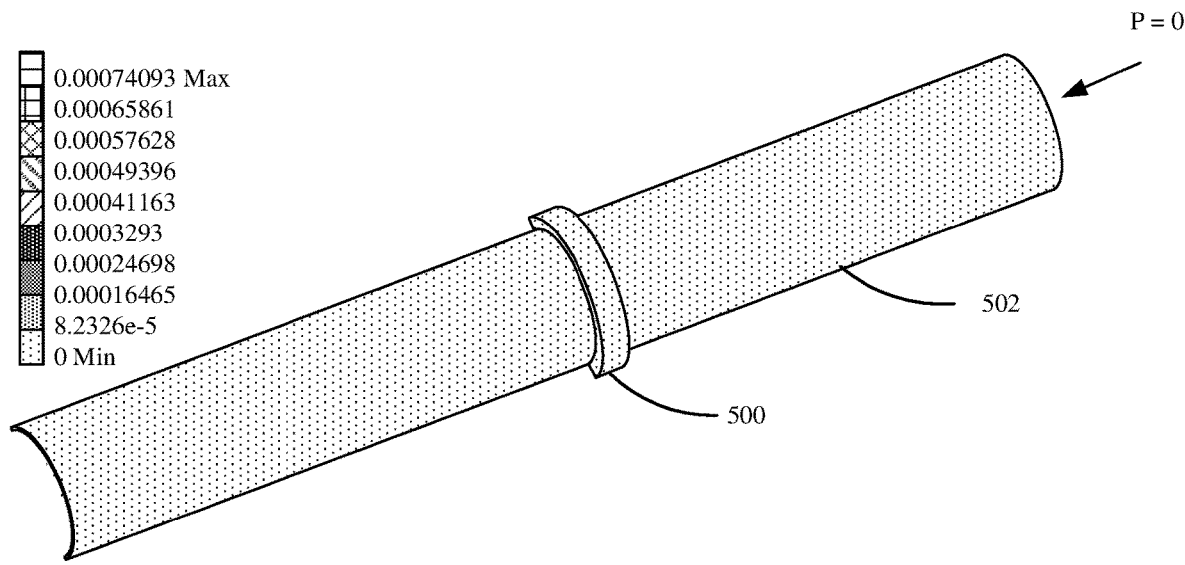
FIGS. 6A and 6B illustrate the effect of the deflection of the outer diameter of a pipe away from a rigid clamp as pressure is applied internally.
Figure 6B:
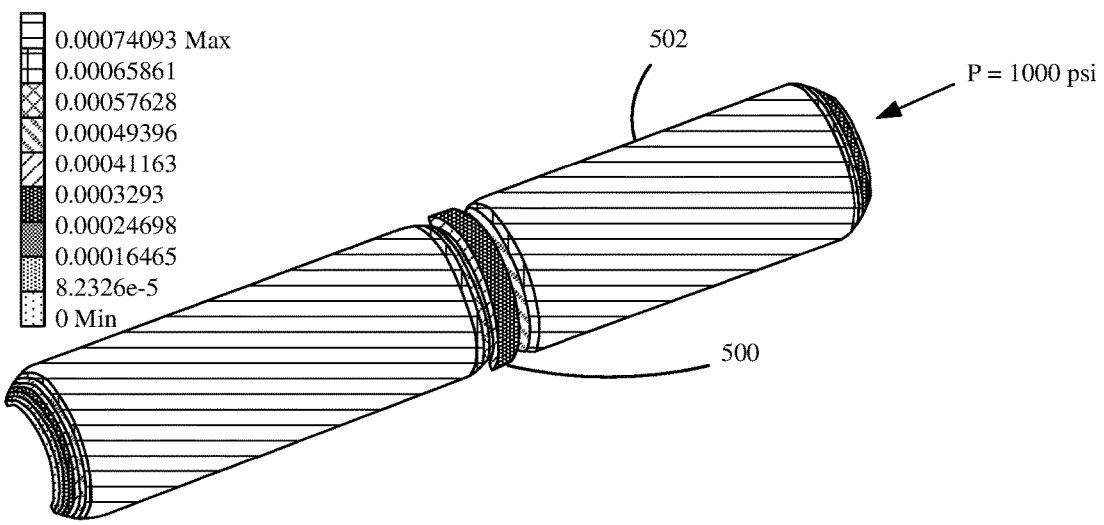
Figure 7:
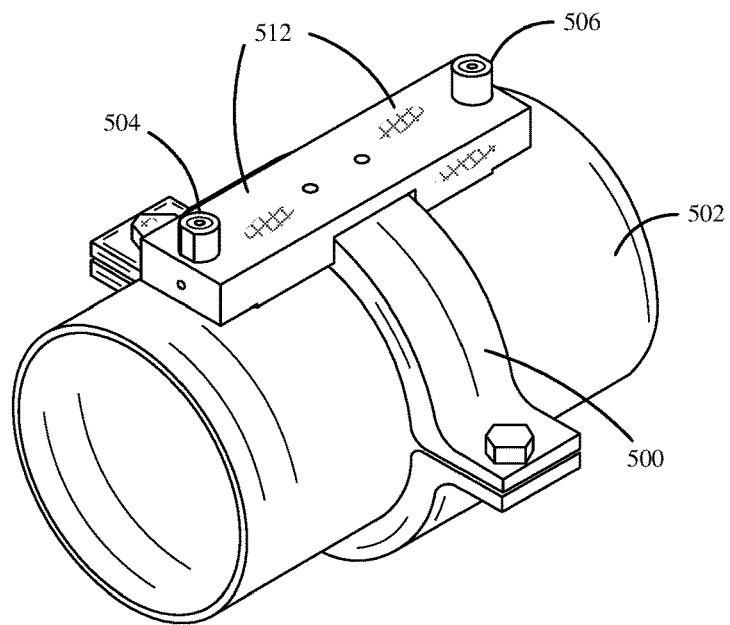
FIG. 7 is a diagrammatic perspective view of a conduit deformation detector in accordance with an embodiment of the present invention.

FIGS. 6A and 6B illustrate conduit deformation that leads to a further embodiment of a clamp-on sensor shown in FIG. 7. In FIGS. 6A and 6B, there is a thick band 500 encircling a pipe 502, which can be considered to be a rigid clamp. The clamp is designed to be robust such that it will not deflect appreciably when the pipe is pressurized. FIG. 6B shows a finite element simulation of a 304 stainless steel pipe (schedule 40) pressurized to 1,000 psi having a rigid clamp 500 in the middle. The shape is exaggerated to see the shape better. What is interesting is that the pipe diameter resumes its full deflection a relatively short distance away from clamp 500, only 3 inches (in the longitudinal direction) in this example. This property can be used to construct a useful pressure sensor such as the one illustrated in FIG. 7.

Figure 8:
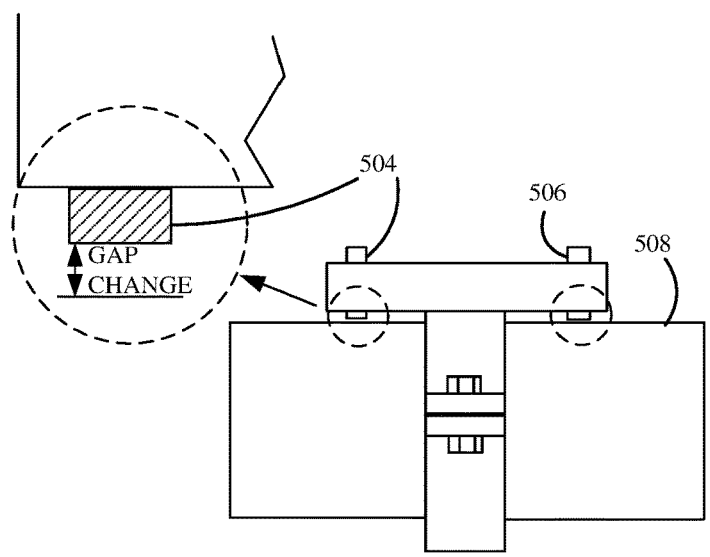
FIG. 8 is a diagrammatic side view of the embodiment shown in FIG. 7 with the displacement sensors highlighted.

FIGS. 7 and 8 are simplified perspective and side views, respectively, showing the location of sensors 504, 506 that detect the gap change relative between arms 512, which are fixed to the relatively immobile bracket, and the pipe's outer surface 508, which deflects according to FIG. 6B with pressure.

For this design, the gap being detected changes according to:

$$\Delta G = 2\frac{P}{E}\left[\frac{a^2}{(b^2-a^2)}\right]b \qquad \text{Equation 6}$$

where the variables, a, b, E, P are defined the same as before.

Figure 4B:
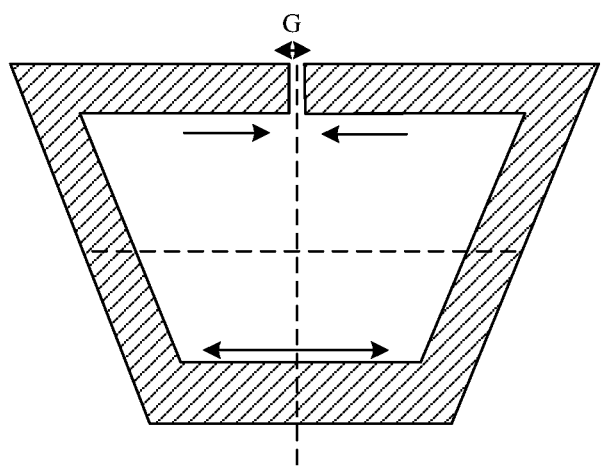

Band 500 is formed as a hinged clamp or a pair of clamp halves that can be bolted or otherwise secured about pipe 502. Arm(s) 512 are affixed to band 500 and extend transversely therefrom. This transverse extension is preferably at least three inches beyond the edge of band 500 such that deformation of pipe 502, in response to internal pressure, is fully developed, as shown in FIG. 6B. The band 500 and arm(s) 512 are preferably constructed from the same material as the pipe in order to minimize thermal expansion effects as already explained following the arguments cited regarding FIGS. 4A and 4B. Accordingly, with changes to temperature, clamp 500 and arms 512 will change in size in much the same way as pipe 502. In the illustrated example, arms 512 extend both upstream and downstream from band 500, with gap measurement system or detectors 504, 506 disposed proximate an end of each arm 512. In one example, each detector 504, 506 is a capacitive sensor that has a capacitance with pipe 502 that varies with the gap between the detector and pipe 502.

By way of example, FIG. 9 tabulates the expected gap changes per ksi (1,000 psi) for a 4.5 in. OD 304 stainless steel pipe having various thickness wall schedules.

Figure 10:
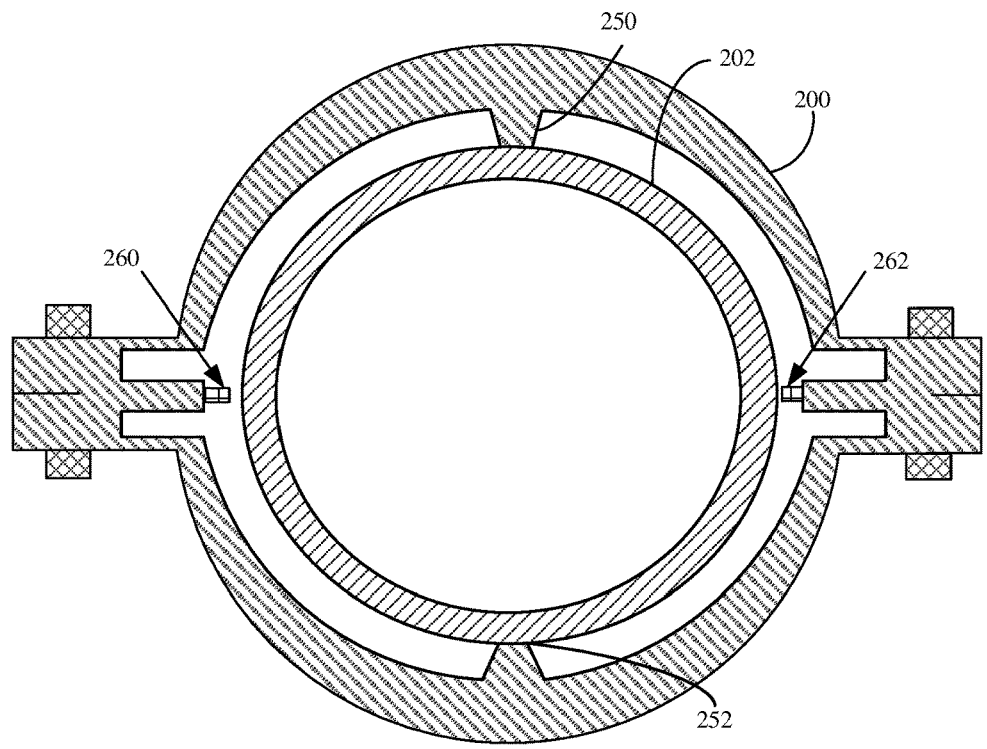
FIG. 10 is a diagrammatic cross-sectional view of a clamp-on sensor disposed above a pipe in accordance with one embodiment of the present invention.

FIG. 10 is a diagrammatic cross-sectional view of another embodiment of a clamp-on sensor 200 disposed about pipe 202 in accordance with the present invention. As shown, clamp-on sensor 200 is configured to physically attach to the external diameter of pipe 202 at attachment points 250, 252. Clamp 200 is preferably constructed from the same material as pipe 202 in order to compensate for thermal expansion/hysteresis effects. Accordingly, with changes to temperature, clamp 200 will change in size in much the same way as pipe 202. However, clamp 200 includes a pair of proximity sensors 260, 262 disposed at approximately 90° from attachment points 250, 252. In this way, as the pressure within pipe 202 increases and pipe 202 deforms outwardly, the proximity sensors 260, 262 will measure a reduced distance to the external surface of pipe 202. Proximity sensors 260, 262 are coupled to suitable measurement circuitry, such as measurement circuitry 218 (shown in FIG. 15) and provide an indication of proximity to the pipe and thus an indication of process fluid pressure within the pipe.

Figure 11:
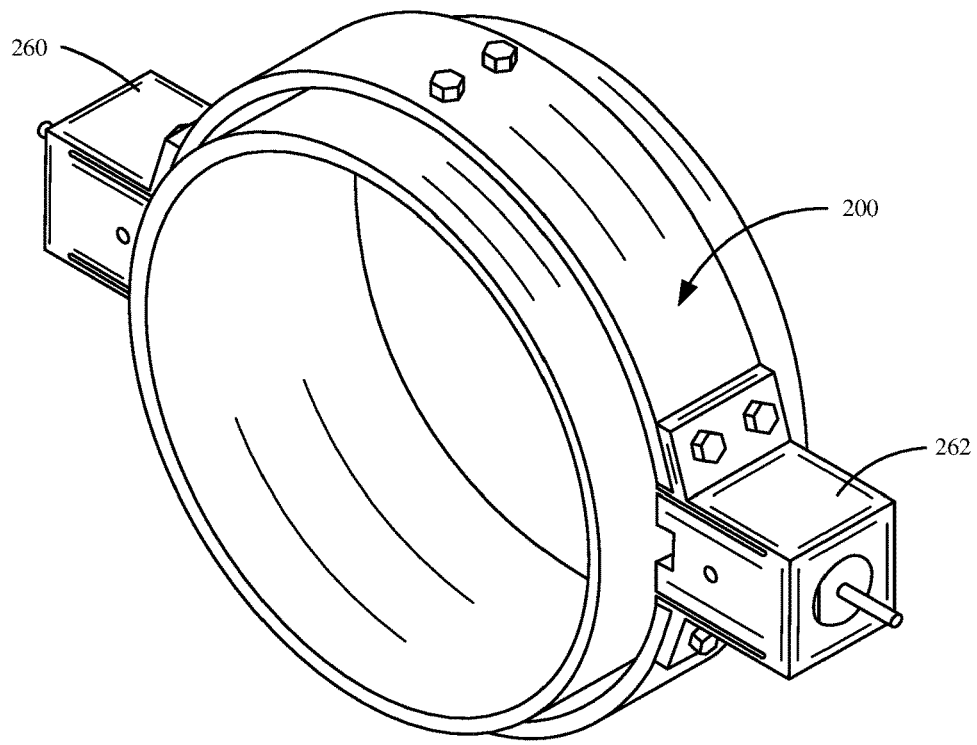
FIG. 11 is a diagrammatic perspective view illustrating a clamp-on sensor with proximity sensors disposed diametrically opposite one another in accordance with an embodiment of the present invention.

FIG. 11 is a diagrammatic perspective view illustrating clamp-on sensor 200 with proximity sensors 260 and 262 disposed diametrically opposite one another.

From the description set forth above, it is apparent that the change in the circumference of the outside diameter of the process fluid conduit varies based, not only on the applied pressure, but also on the material of the process fluid conduit, and the thickness of the pipe wall. Accordingly, embodiments described herein, generally include the calibration of a non-intrusive process fluid pressure measurement system once it is mounted to a particular process fluid conduit.

Figure 12:
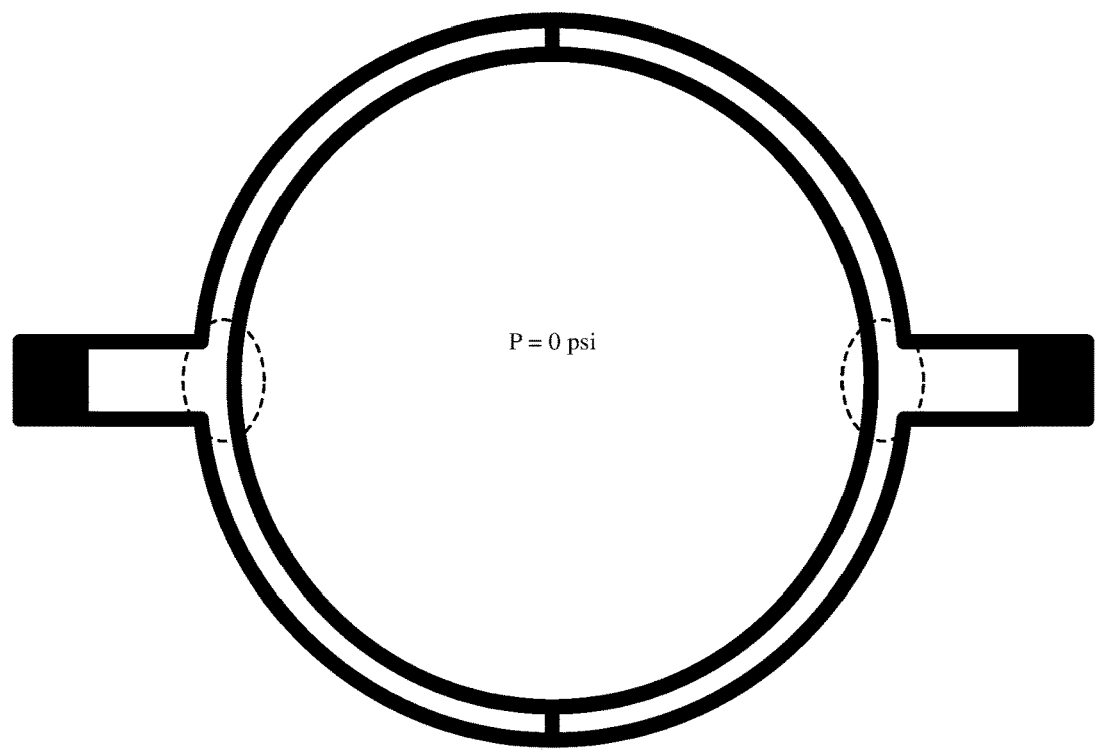
FIGS. 12 and 13 are diagrammatic finite element analysis models illustrating the behavior of the clamped assembly as pressure is applied internally to a pipe on which the sensor is clamped.
Figure 13:
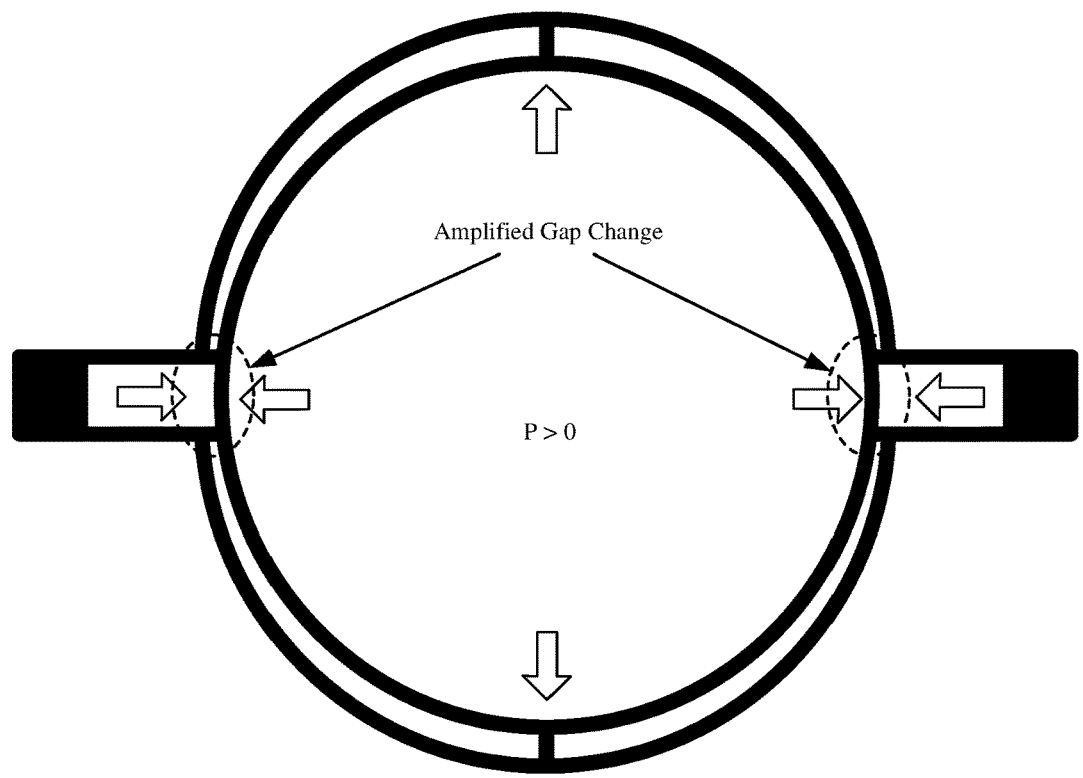

FIGS. 12 and 13 are simplified diagrammatic finite element analysis models illustrating the behavior of the clamped assembly as pressure is applied internally to a pipe on which the sensor is clamped. In the illustrated example, the deformation scale is exaggerated by a factor of 50. The circled areas highlight how the gap spacing decreases as pressure is applied. Note, that two effects are present. One effect is that the pipe is expanding outwardly, and secondly, the sides of the brackets due to a mechanical effect, are moving inwardly. This amplifies the gap change beyond simple changes in the conduit diameter. Moreover, the output of the device can be configured to be the sum of the two sensors, which doubles the signal as well as minimizing side-to-side disturbances, since the sum of the two gaps will remain constant under side-to-side movement. Hence, the net gap only changes when pressure is applied inside the conduit. The result is a robust measurement that has a signal output almost four times larger than the single bracket approach described above with respect to FIG. 1. Lastly, the thermal effects are still low provided the clamp material is made from the same material as the pipe.

Figure 14:
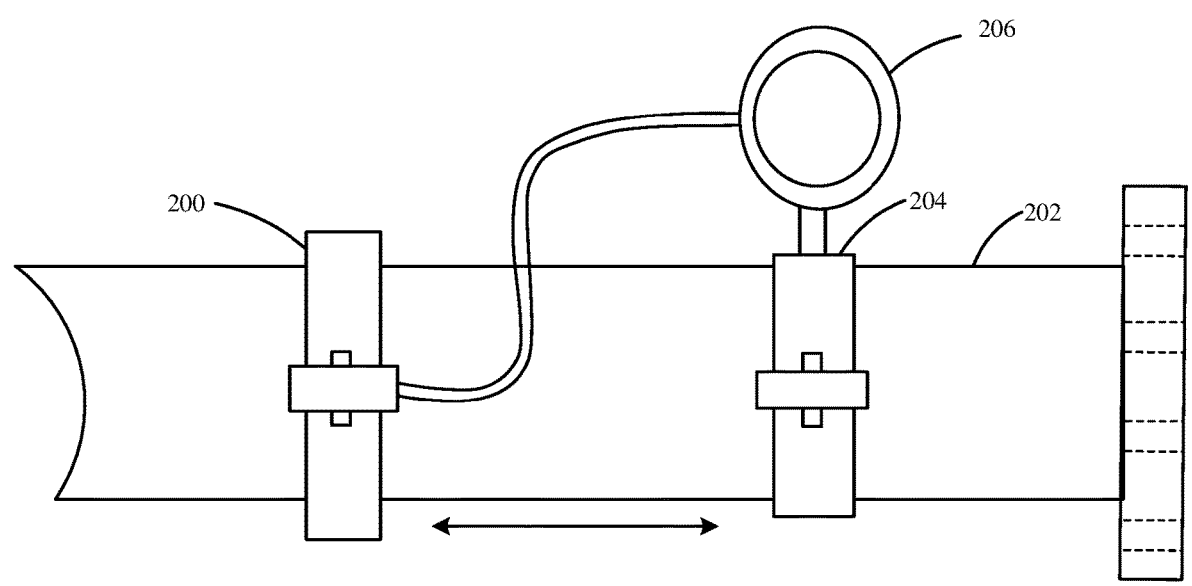
FIG. 14 is a diagrammatic view of a clamp-on sensor clamped to process fluid conduit and electrically coupled to a transmitter in accordance with an embodiment of the present invention.

FIG. 14 illustrates an example where a clamp-on sensor 200 is clamped to process fluid conduit 202 and then electrically coupled to process fluid pressure transmitter 204 which is somewhat spaced from clamp-on sensor 200 along conduit 202. Clamp-on sensor 200 is configured to provide an indication relative to one or more gaps that change as process fluid conduit 202 reacts to changes in process fluid pressure. The electrical signals from the one or more gap sensors within clamp-on sensor 200 are provided to electronics within transmitter housing 206 to be processed to provide a process fluid pressure output that is then communicated to remote electronics, such as a control room.

The embodiment shown in FIGS. 7 and 14 are believed to be particularly advantageous in that they do not require any particular permanent mounting (i.e., welding) to the process fluid conduit. Thus, the embodiments shown in FIGS. 7 and 14 can be attached to the process fluid conduit anywhere that it is desired to measure process fluid pressure. The spacing of transmitter 204 from clamp-on sensor 200 is beneficial in order to minimize disturbances that might arise from the transmitter mounting. The separate mounting also affords the possibility of having additional process measurements, such as temperature and/or corrosion and pipe wall thickness measurements.

Figure 15:
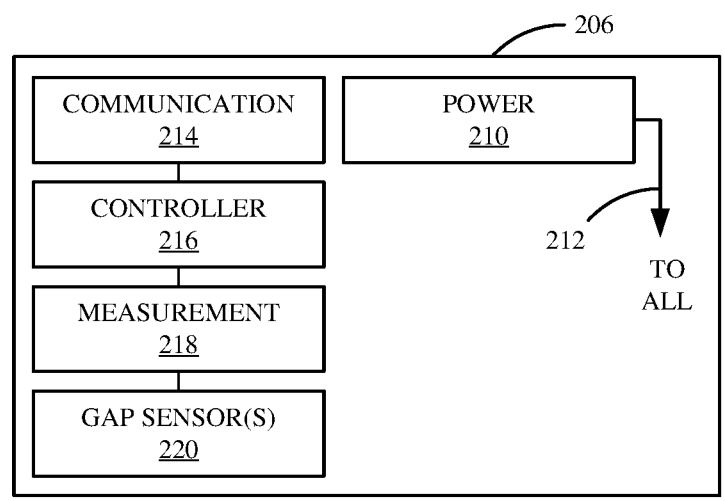
FIG. 15 is a diagrammatic view of system electronics in accordance with an embodiment of the present invention.

FIG. 15 is a diagrammatic view of electronics within housing 206. As shown, a power module 210 is configured to provide power to the various components of the transmitter as indicated by arrow 212 labeled "to all." In embodiments where the transmitter is a wireless transmitter, power module may include a battery, rechargeable or non-rechargeable, and suitable power conditioning components to provide the appropriate voltage and current levels to the various components within the transmitter. In embodiments where transmitter 204 is configured to couple to a wired process communication loop or segment, power module 210 may be adapted to derive all power required to operate transmitter 204 from electrical energy provided over the process communication loop or segment.

Communications module 214 is coupled to controller 216 and provides controller 216 with the ability to communicate in accordance with a process communication standard protocol. Examples of wired process communication standard protocols include the Highway Addressable Remote Transducer (HART®) protocol and the FOUNDATION™ Fieldbus protocols. An example of a wireless process communication protocol for which communication module 214 may be adapted is the known WirelessHART protocol (IEC62591).

Controller 216 may be any suitable electrical device or arrangement of logic that is able to execute instructions or programmatic steps to determine a process fluid pressure estimation output based on a gap measurement. In one example, controller 216 is a microprocessor having associated timing and memory circuitry disposed therein. Controller 216 is coupled to measurement module 218, which may include one or more analog-to-digital converters that allow controller 216 to obtain information indicative of electrical signals provided the gap sensors. One example of a suitable gap sensor is the capacitive plate arrangement described above. However, it is expressly contemplated, that any suitable technology that is able to accurately and reliably obtain information indicative of the gap can be used. Examples of such technology include optical techniques (interferometry, attenuation, et cetera); eddy current proximity detection; acoustic echo location, strain gauge technology; and magnetic technology (variable reluctance, inductance, hall sensors, et cetera).

Measurement module 218 is coupled to one or more gap sensors 220 that provide an electrical indication indicative of the varying gap. In the embodiment described above, the gap sensor may be a single parallel-plate capacitor. However, other forms of gap measurement, as described above, can be used.

Figure 16:
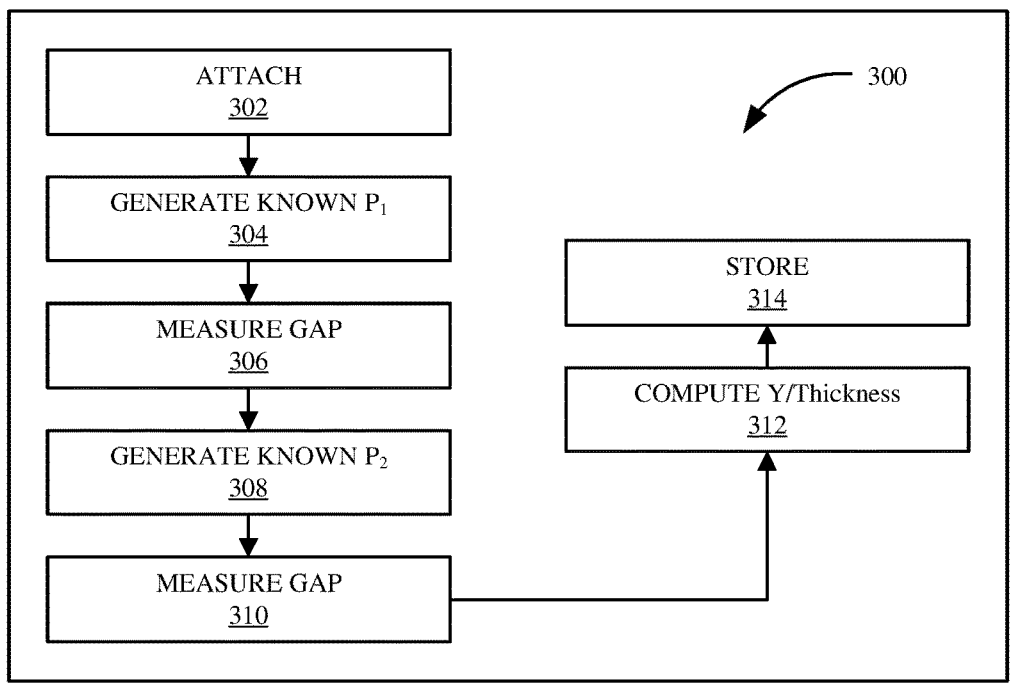
FIG. 16 is a flow diagram of a method of calibrating a process fluid pressure estimations system in accordance with an embodiment of the present invention.

FIG. 16 is a flow diagram of a method of calibrating such a system in accordance with an embodiment of the present invention. Method 300 begins at block 302 where the non-intrusive process fluid pressure measurement system is attached to a particular process fluid conduit. The attachment may be in the form of welding a mirrored-Z structure to such a conduit or clamping a clamp-on structure to the process fluid conduit. Next, at block 304, a first known pressure ($P_1$) is generated within the process fluid conduit. While the internal pressure $P_1$ is present within the process fluid conduit, a gap measurement is obtained using one or more gap sensors, as indicated at block 306. Next, at block 308, a second known pressure ($P_2$) is generated within the process fluid conduit, and, at block 310, the gap is measured again. With the two known pressures and two measured gaps, the system is solved for the constants (related to pipe wall thickness and Young's Modulus). Note, in some embodiments, these quantities may be entered directly into the system via a user interface or via process communication, or they may be selected by a user when the system is ordered or otherwise manufactured. At block 312, the known quantities for pipe wall thickness and Young's Modulus 312 are stored 314 in memory, such as memory of controller 216 for use during operation.

Figure 17:
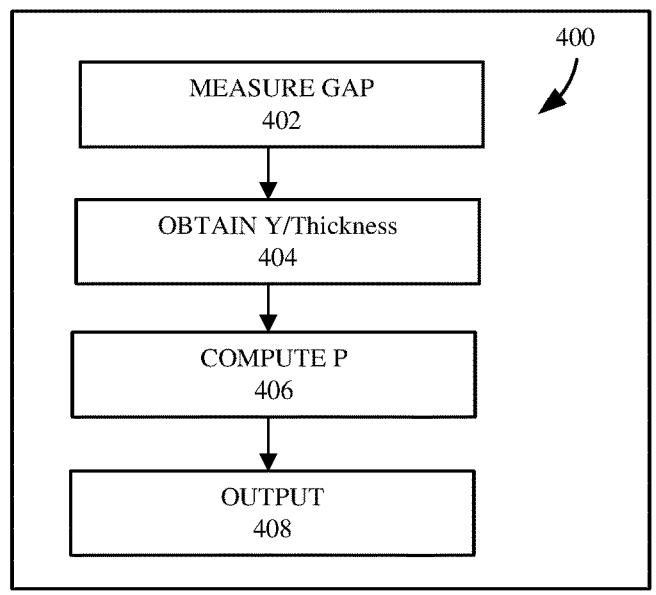
FIG. 17 is a diagrammatic view of a method of measuring process fluid pressure in a non-intrusive manner in accordance with an embodiment of the present invention.

FIG. 17 is a flow diagram of a method of non-intrusively measuring process fluid pressure. Method 400 begins at block 402 where a gap of a structure that is attached to an outside surface of the process fluid conduit is measured. Next, at block 404, information related to the Young's Modulus and conduit wall thickness are obtained. At block 406, the measured gap, and obtained Young's Modulus and pipe wall thickness are used to compute a process fluid pressure within the process fluid conduit. Finally, at block 408, the computed process fluid pressure is provided as an output. This output may be in the form of a local indication, such as via a user interface, or communicated to a remote electronic device, such as over a process communication loop, either wired or wirelessly.

Embodiments described herein generally lend themselves to enhanced multi-variable measurements as well. The clamp-on sensor could integrate a process thermal measurement via either a temperature sensor located within the clamp-on pressure sensor assembly, or into the transmitter housing attachment 206 using non-intrusive process fluid temperature estimation technology. Additionally, information could be obtained from a sensor integrated into housing attachment 206 which would provide property pipe characterization (i.e., wall thickness, material type), as well as corrosion information.

Figure 18:
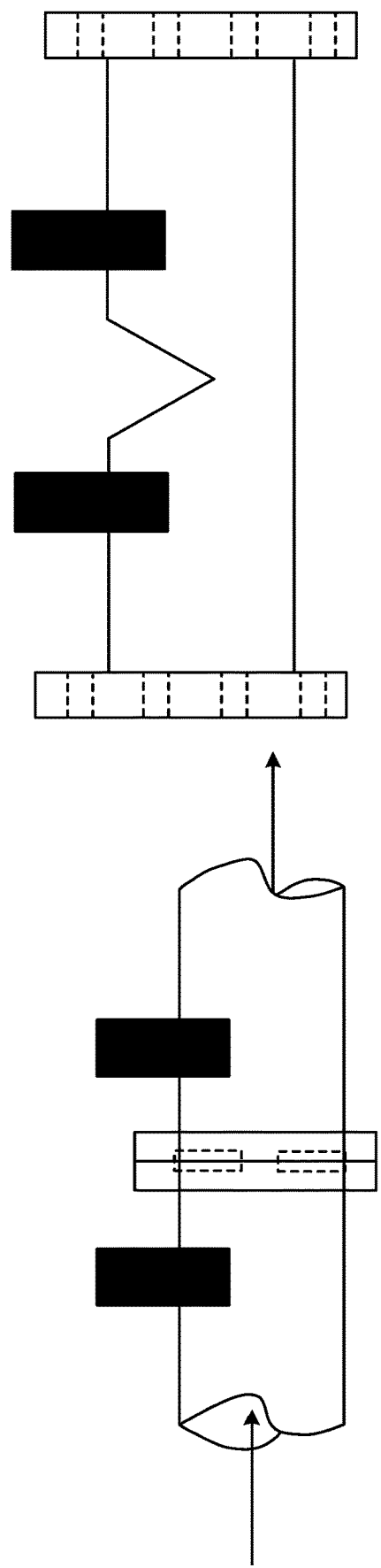
FIG. 18 illustrates a pair of examples with multiple non-intrusive process fluid pressure sensors disposed on opposite sides of a flow restriction in accordance with an embodiment of the present invention.

FIG. 18 illustrates a pair of examples with multiple non-intrusive process fluid pressure sensors disposed on opposite sides of a flow restriction. The use of a second clamp-on sensor could also be configured to measure the pressure drop across the restriction in the pipe. Based on knowledge of this restriction, the two pressure measurements could provide an indication of process fluid flow.

While embodiments have generally been described with respect to a mirrored assembly that is welded or otherwise permanently affixed to an outside surface of a conduit, or a clamp-on assembly, it is expressly contemplated that a spool assembly could be provided where a section of pipe could have a pair of mounting flanges, and a non-intrusive sensor pre-mounted to the short spool section of the pipe. Then, installation of the non-intrusive process fluid pressure measurement system to the process would be as simple as mounting the spool using the pair of mounting pipe flanges.

While the embodiment described with respect to FIG. 1 shows a mirrored or opposed structure having a gap between the two components, where the components are physically separated by the gap, it is also expressly contemplated that the components could be mechanically coupled, such as via a scissor hinge point, in order to provide a suitable amount of mechanism attenuation of the gap change relative to the change in circumference of the process fluid conduit. Additionally, the built-in gap sensors could also be used to detect vibration of the pipe, or other mechanical perturbations. Finally, the entire product could be wireless, as described above.

Although the present invention has been described with reference to preferred embodiments, workers skilled in the art will recognize that changes may be made in form and detail without departing from the spirit and scope of the invention.

What is claimed is:

1. A system for non-intrusively measuring process fluid pressure within a process fluid conduit, the system comprising:
   a measurement bracket configured to couple to an external surface of the process fluid conduit, the measurement bracket generating a variable gap based on deformation of the process fluid conduit in response to process fluid pressure therein;
   a gap measurement system coupled to the measurement bracket and configured to provide an electrical signal based on a measurement of the variable gap;
   a controller coupled to the gap measurement system and configured to calculate and provide a process fluid pressure based on the electrical signal and information relative to the process fluid conduit; and
   wherein the information relative to the process fluid conduit includes a wall thickness of the process fluid conduit.

2. The pressure measuring system of claim 1, wherein the information relative to the process fluid conduit includes an indication of material type of the process fluid conduit.

3. The pressure measuring system of claim 2, wherein the information relative to the process fluid conduit includes a Young's Modulus for material of the process fluid conduit.

4. The pressure measuring system of claim 1, wherein the bracket includes a mirrored structure that detects an arc, or portion of a circumference of the fluid conduit.

5. The pressure measuring system of claim 4, wherein the bracket includes an electrode disposed on each half of the mirrored structure, the electrodes forming a variable parallel plate capacitor having a capacitance that varies with the gap.

6. The pressure measuring system of claim 1, wherein the bracket is formed of the same material as the process fluid conduit.

7. The pressure measuring system of claim 1, wherein the bracket is welded to the process fluid conduit.

8. The pressure measuring system of claim 1, wherein the bracket includes a clamp that is configured to mount to the process fluid conduit.

9. The pressure measuring system of claim 8, wherein the clamp is configured to releasably mount to the process fluid conduit.

10. The pressure measuring system of claim 9, wherein the clamp includes a pair of attachment points configured to contact the external surface of the process fluid conduit.

11. The pressure measuring system of claim 10, wherein the pair of attachments points are configured to be located diametrically opposite from one another on the process fluid conduit.

12. The pressure measuring system of claim 11, and further comprising at least one gap sensor disposed proximate the external surface of the process fluid conduit and configured to provide an indication of distance to the external surface of the process fluid conduit.

13. The pressure measuring system of claim 12, wherein at least one gap sensor includes a pair of gap sensors disposed diametrically opposite from one another.

14. The pressure measuring system of claim 13, wherein the plurality of gap sensors are disposed 90 degrees from the pair of attachment points.

15. The pressure measuring system of claim 13, wherein the plurality of gap sensors are capacitance sensors.

16. The pressure measuring system of claim 13, wherein the plurality of gap sensors are optical sensors.

17. The pressure measuring system of claim 13, wherein the plurality of gap sensors are eddy current proximity detection sensors.

18. The pressure measuring system of claim 13, wherein the plurality of gap sensors are acoustic echo location sensors.

19. The pressure measuring system of claim 13, wherein the plurality of gap sensors are strain gauges.

20. The pressure measuring system of claim 1, and further comprising a temperature sensor operably coupled to the bracket to provide an indication of a temperature of the process fluid conduit.

21. The pressure measuring system of claim 1, and further comprising a second bracket configured to be mounted to the process fluid conduit and spaced from the first bracket along the process fluid conduit wherein an obstruction within the process fluid conduit between the first and second brackets generates a pressure differential related to process fluid flow.

22. The pressure measuring system of claim 1, wherein the system further comprises a process fluid pressure transmitter which communicates the calculated process fluid pressure to a remote location.

23. The pressure measuring system of claim 22, wherein the process fluid pressure transmitter is secured to the process fluid conduit at a location spaced away from the measurement bracket.

24. A system for non-intrusively measuring process fluid pressure within a process fluid conduit, the system comprising:
   a measurement bracket configured to couple to an external surface of the process fluid conduit, the measurement bracket having a band configured to encircle the process fluid conduit and at least one arm extending transverse to the band;
   a gap measurement system coupled to the at least one arm of the measurement bracket and being configured to provide an electrical signal based on a variable gap between the gap measurement system and the process fluid conduit;
   a controller coupled to the gap measurement system and configured to calculate and provide a process fluid pressure based on the electrical signal and information relative to the process fluid conduit; and
   wherein the band is a rigid clamp that is configured to not deflect in response to pressure changes within the process fluid conduit.

25. The system of claim 24, wherein the at least one arm comprises a plurality of arms extending in opposite directions, each arm having a gap measurement system coupled thereto.

26. The system of claim 24, wherein the gap measurement system includes a capacitive displacement sensor configured to sense a capacitance with the process fluid conduit, the sensed capacitance being indicative of a gap between the gap measurement system and the process fluid conduit.

27. The system of claim 24, wherein the gap measurement system includes an eddy current proximity detector.

* * * * *